(12) United States Patent
Tsukui et al.

(10) Patent No.: US 7,121,256 B2
(45) Date of Patent: Oct. 17, 2006

(54) THROTTLE BODY

(75) Inventors: Takaaki Tsukui, Wako (JP); Kazuhito Hotta, Wako (JP); Shinji Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 10/803,045

(22) Filed: Mar. 16, 2004

(65) Prior Publication Data

US 2004/0237934 A1   Dec. 2, 2004

(30) Foreign Application Priority Data

Mar. 27, 2003 (JP) ............... 2003-087715

(51) Int. Cl.
*F02D 9/10* (2006.01)
(52) U.S. Cl. .................. 123/336; 123/399; 123/470
(58) Field of Classification Search ........... 123/336, 123/337, 319, 402, 344, 442, 399, 470, 472
See application file for complete search history.

(56) References Cited

U.S. PATENT DOCUMENTS

| | | | | |
|---|---|---|---|---|
| 3,205,879 A * | 9/1965 | Von Seggern et al. | ...... | 123/581 |
| 4,243,001 A * | 1/1981 | Yamada | ...... | 123/583 |
| 5,361,734 A | 11/1994 | Shirai | | |
| 5,704,334 A * | 1/1998 | Kato | ...... | 123/336 |
| 5,957,108 A | 9/1999 | Kato | | |
| 6,158,414 A * | 12/2000 | Ma | ...... | 123/336 |
| 6,581,567 B1 * | 6/2003 | Deguchi | ...... | 123/336 |
| 6,763,802 B1 * | 7/2004 | Brassell | ...... | 123/336 |
| 6,895,926 B1 * | 5/2005 | Moreau et al. | ...... | 123/336 |

FOREIGN PATENT DOCUMENTS

| | | |
|---|---|---|
| EP | 1 296 042 | 3/2003 |
| JP | 58-35244 | 3/1983 |
| JP | 7-150982 | 6/1995 |
| JP | 2002-256895 | 9/2002 |
| JP | 2002-256896 | 9/2002 |
| JP | 2002-256900 | 9/2002 |

* cited by examiner

*Primary Examiner*—T. M. Argenbright
(74) *Attorney, Agent, or Firm*—Hamre, Schumann, Mueller and Larson, PC (57) ABSTRACT

A throttle body for controlling a plurality of throttle valves in a multi-cylinder engine. The throttle valves of at least two of the cylinders are structurally connected to each other.

12 Claims, 7 Drawing Sheets

THROTTLE BODY

TECHNICAL FIELD

The present invention relates, for example, to an electronic controlled throttle body used in a multi-cylinder engine.

BACKGROUND

In recent years, it has been common to use an electronic throttle control device that detects the actuated amount of a throttle grip or an accelerator pedal and controls, based on the actuated amount of the throttle grip or the accelerator pedal, the opening of a throttle valve through a motor.

When the throttle control device of this type is to be disposed in an engine provided with an injector supplying fuel through injection into an intake passageway, it is desirable that, for example, a motor and a throttle opening sensor be disposed as compactly as possible, while avoiding interference with a fuel injection valve.

An arrangement is known in which the motor is disposed on the same side as the injector. See Japanese Patent Laid-open No. 2002-256895. If the motor is disposed on the same side as the injector, however, a wide space must be provided on an upper portion of the throttle body. This presents the problem of uneven distribution of a space around the throttle body.

In some known configurations, the motor and the throttle opening sensor may be disposed in an axial direction of the throttle valve. This, however, results in the length of the throttle body in the direction of cylinder arrangement being elongated by the length of these parts. This, in turn, leads to an enlarged engine.

SUMMARY

The present invention is related to a throttle body. The throttle body can be used in a motor for controlling a throttle valve in a multi-cylinder internal combustion engine.

According to one aspect of the invention, a throttle body includes some of a plurality of throttle valves that are structurally connected together. This arrangement preferably allows the throttle valves connected together to be disposed in close proximity to each other, thus contributing to a shorter length in the cylinder arrangement direction. The arrangement also preferably allows the connected throttle valves to be integrally driven.

According to another aspect, a throttle body for controlling a throttle valve in an internal combustion engine includes a throttle opening sensor that detects the opening of the throttle valve and an injector that are disposed oppositely on either side of a throttle body main body. This arrangement disposes the throttle opening sensor and the injector on either side of the throttle body main body. The arrangement thus preferably allows a space around the throttle body main body to be compactly arranged, enabling an effective use of the surrounding space.

According to yet another aspect, the motor and an injector are disposed oppositely on either side of a throttle body main body. This arrangement disposes the motor and the injector on either side of the throttle body main body. The arrangement thus preferably allows a space around the throttle body main body to be compactly arranged, enabling an effective use of the surrounding space.

According to another aspect, some of a plurality of throttle valves are structurally connected together. This arrangement preferably allows engine valves to pause in at least part of the cylinders in the multi-cylinder internal combustion engine. This arrangement preferably allows the throttle valve to be closed by the motor in the cylinder, in which the engine valves pause.

DETAILED DESCRIPTION

Figure 1:
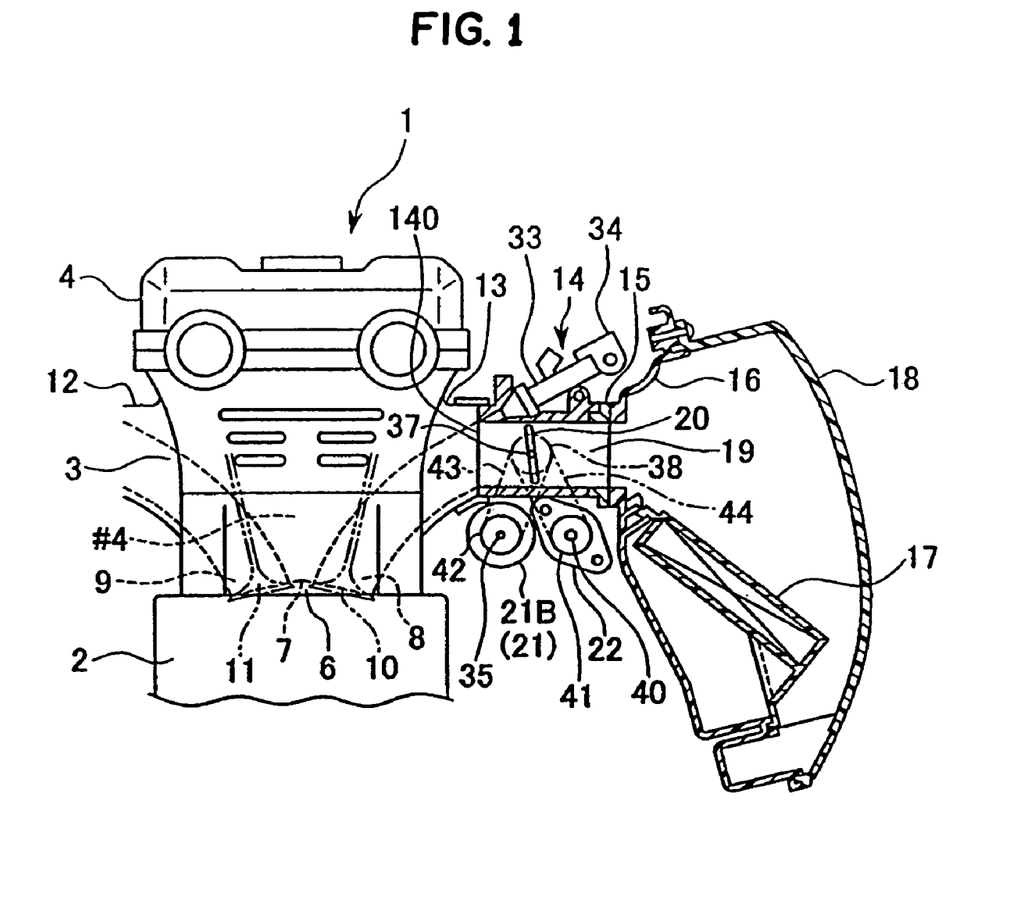
FIG. 1 is a cross-sectional view taken along line 1—1 of the engine shown in FIG. 2.
Figure 2:
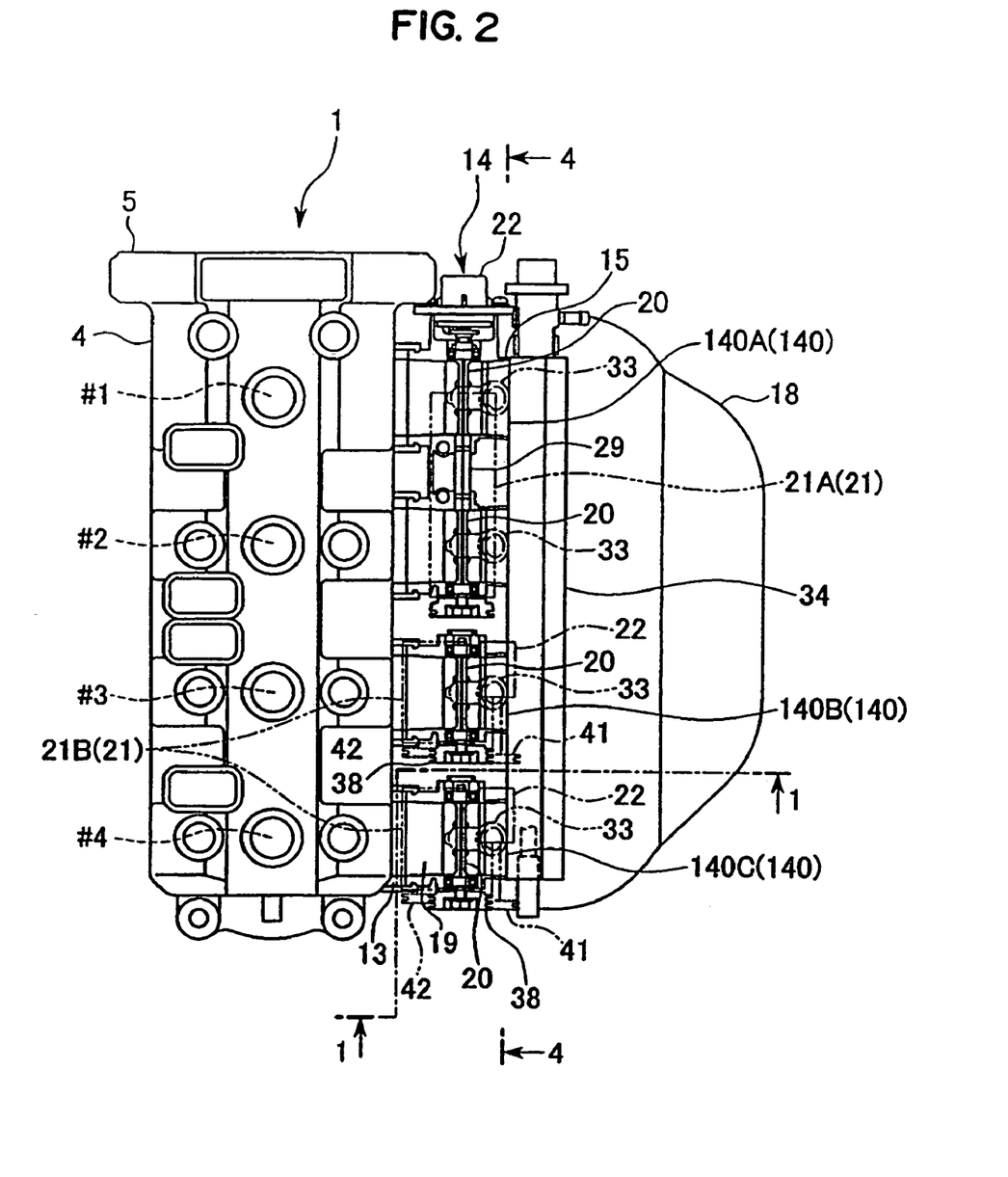
FIG. 2 is a plan view showing an embodiment of an engine made in accordance with the present invention.

A first preferred embodiment of the present invention will be described with reference to the accompanying drawings. Referring to FIGS. 1 and 2, a water-cooled four-cycle in-line four-cylinder engine 1 is used in a motorcycle.

The engine 1 is mounted on a vehicle body frame with a crankshaft (not shown oriented toward a vehicle width direction).

The engine 1 comprises a cylinder block 2, on a top surface of which a cylinder head 3 is secured. Further, a head cover 4 is attached to a top surface of the cylinder head 3. A cam chain case 5 is formed on a side portion of the engine 1. The engine 1 is provided with cylinders in order of cylinder #1, cylinder #2, cylinder #3, and cylinder #4 from the side of the cam chain case 5. Each cylinder is provided with two intake valves and two exhaust valves, to be described further below.

The aforementioned four cylinders are disposed in the vehicle width direction. An intake valve opening 8 and an exhaust valve opening 9 are formed in a recessed portion 7 forming a combustion chamber 6 of the cylinder head 3 in each of these cylinders. The intake valve opening 8 and the exhaust valve opening 9 are opened and closed by an intake valve 10 and an exhaust valve 11, respectively.

An exhaust port 12, communicating with the exhaust valve opening 9, is formed to face a front wall of the cylinder head 3 and connected to an exhaust pipe not shown. An intake port 13, communicating with the intake valve opening 8, is formed to face a rear wall of the cylinder head 3. A throttle body 14 is connected to each intake port 13.

The throttle body is connected substantially horizontally. An intake duct 16 is connected to an air intake port 15 on an upstream side of the throttle body 14. An air cleaner 18 provided with an air cleaner element 17 is provided inside the intake duct 16. Intake air that flows through the air cleaner 18 is introduced into each cylinder through the throttle body 14.

A butterfly type throttle valve 20 is provided in an intake passageway 19 of the throttle body 14. The throttle valve 20 can be actuated between a fully open position and a fully closed position. The throttle valve 20 is preferably of an electronic throttle control type. Specifically, the throttle valve 20 is opened or closed, being operatively connected to a motor 21 (21A, 21B), in accordance with a grip opening manipulated by a rider to accelerate or decelerate. A throttle opening sensor 22 for detecting a throttle opening is operatively connected to the throttle valve 20. The throttle opening sensor 22 is capable of accurately detecting a rotating angle of the throttle valve 20 as the throttle valve 20 is rotated by the motor 21.

Figure 4:
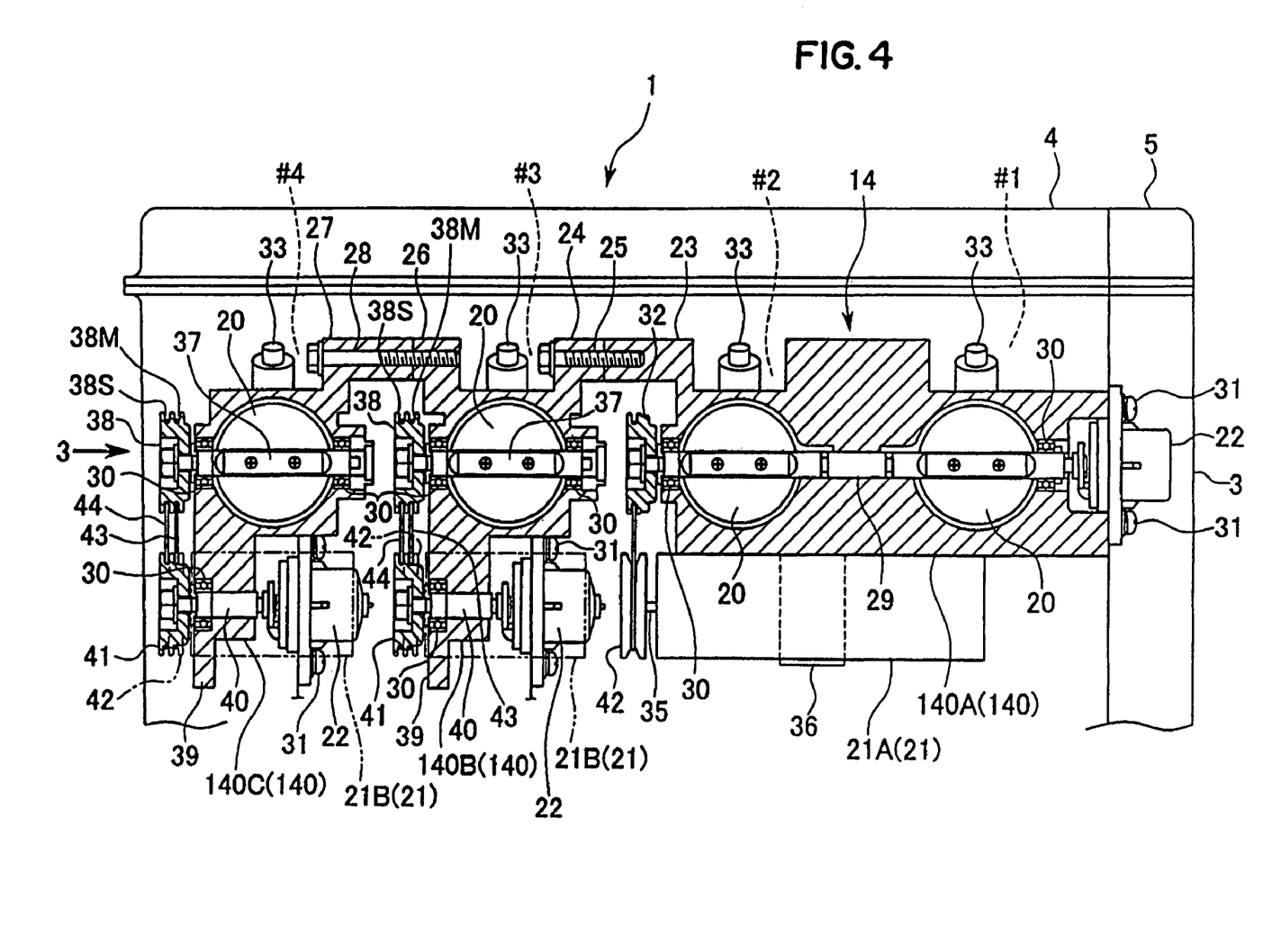
FIG. 4 is a cross-sectional view taken along line 4—4 shown in FIG. 2.

More specifically, the throttle body 14 comprises four throttle valves 20, 20, 20, 20 provided in a throttle body main body 140, as shown in FIG. 4. The throttle body main body 140 comprises three sections connected to each other: a first-second throttle body main body 140A corresponding to cylinder #1 and cylinder #2; a third throttle body main body 140B corresponding to cylinder #3; and a fourth throttle body main body 140C corresponding to cylinder #4.

A mounting bracket 24 for the third throttle body main body 140B is tightened and secured using a bolt 25 to a mounting bracket 23 provided on an upper portion of the first-second throttle body main body 140A. A mounting bracket 27 for the fourth throttle body main body 140C is tightened and secured using a bolt 28 to a mounting bracket 26 of the third throttle body main body 140B.

The throttle valves 20 of the first-second throttle body main body 140A are connected to each other through a common first-second shaft 29. Both end portions of the first-second shaft 29 are rotatably supported through bearings 30 by the first-second throttle body main body 140A. That is, two of the total four throttle valves 20 are structurally connected to each other. The throttle opening sensor 22 is mounted on the first-second throttle body main body 140A with screws 31 coaxially on an end portion of the first-second shaft 29 on the side of the cam chain case 5. A pulley 32 is mounted on an end portion of the first-second shaft 29 opposite to the cam chain case 5. Injectors 33, 33 are inserted and secured slantwise toward each intake valve 10 on an upper portion, or an upper wall, of the first-second throttle body main body 140A. Each injector 33 injects fuel into each intake passageway 19.

The injectors 33 are connected to a fuel supply pipe 34 (see FIGS. 1 and 2). The first-second motor 21A is mounted on a side of the first-second throttle body main body 140A opposite to the injector 33. The first-second motor 21A is mounted by means of a clamping bracket 36 so that a driving shaft 35 thereof runs parallel with the first-second shaft 29. A pulley 42 is mounted on an end portion of the driving shaft 35 of the first-second motor 21A opposite to the cam chain case 5.

Both end portions of a shaft 37 of the throttle valve 20 of the third throttle body main body 140B are rotatably supported through the bearings 30 on the third throttle body main body 140B. A pulley 38 having two pulley grooves 38M, 38S is mounted on an end portion of the shaft 37 opposite to the cam chain case 5. There is an injector 33 having the same configuration as that described earlier provided on an upper portion of the third throttle body main body 140B. The injector 33 is inserted and secured slantwise toward the intake valve 10.

A mounting seat 39 is formed in an extended manner on a lower portion of the third throttle body main body 140B. A sensor shaft 40 of a throttle opening sensor 22 is mounted to this mounting seat 39. The sensor shaft 40 is inserted by way of a bearing 30 and secured in position with screws 31 so as to run parallel with the shaft 37. A pulley 41 is mounted on an end portion of the sensor shaft 40 of the throttle opening sensor 22 opposite to the cam chain case 5. That is, the throttle opening sensor 22 is mounted on a side opposite to the injector 33.

Figure 3:
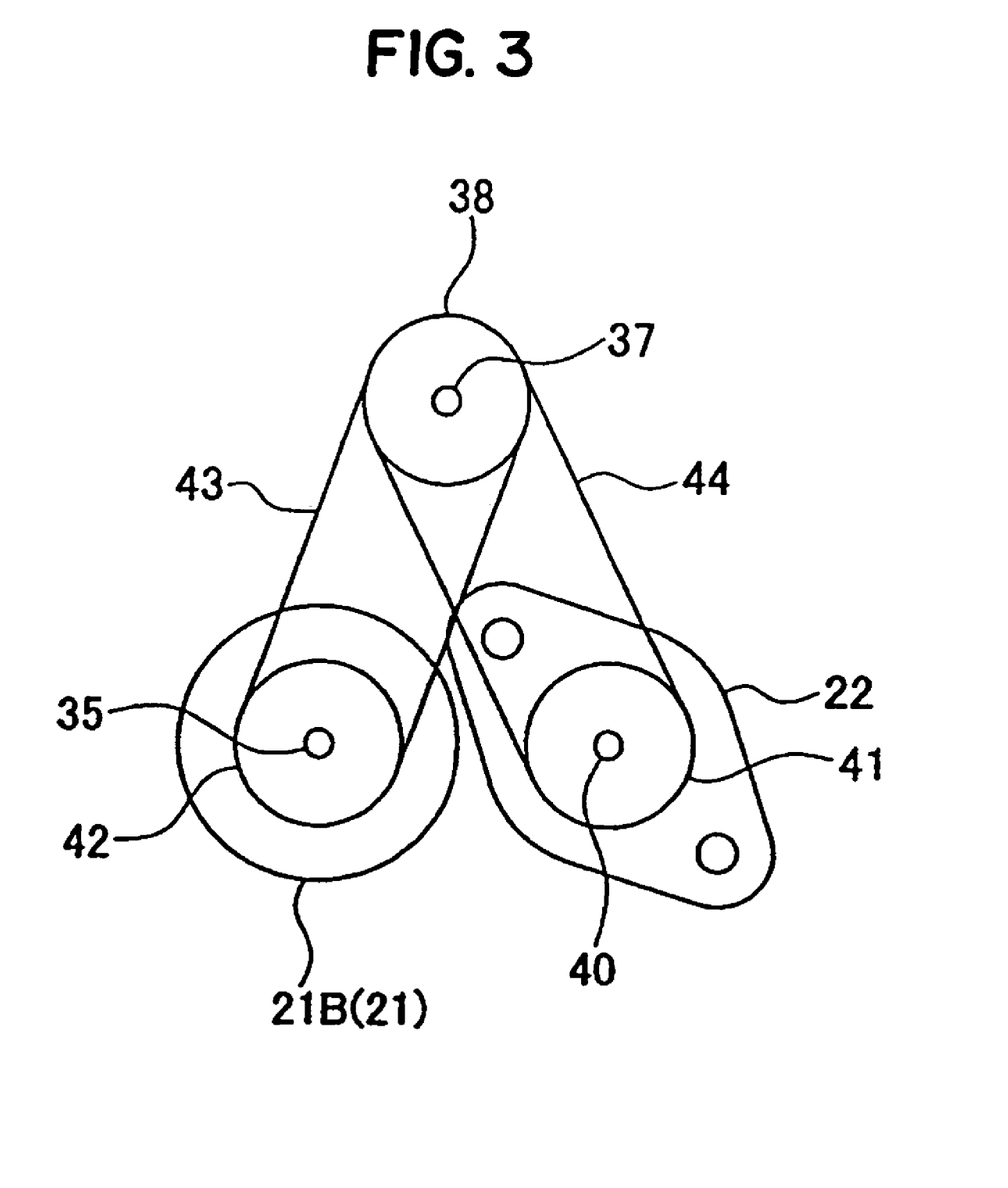
FIG. 3 is a perspective view taken from 3 shown in FIG. 4.

The motor 21B is mounted by way of a bracket, not shown on a front side of the throttle opening sensor 22 and on an opposite side of the injector 33. The motor 21B is mounted so that a driving shaft 35 thereof runs parallel with the shaft 37. A pulley 42 is mounted on an end portion of the driving shaft 35 of the motor 21B opposite to the cam chain case 5. The motor 21B is therefore preferably mounted on a side opposite to the injector 33. As shown also in FIG. 3, the pulley groove 38M in the pulley 38 of the shaft 37 and a pulley groove in the pulley 42 of the motor 21B are connected by way of an endless wire 43. The pulley groove 38S in the pulley 38 of the shaft 37 and a pulley groove in the pulley 41 of the throttle opening sensor 22 are connected by way of an endless wire 44.

The fourth throttle body main body 140C has substantially the same configuration as the third throttle body main body 140B. Both end portions of a shaft 37 of the throttle valve 20 are rotatably supported through bearings 30 on the fourth throttle body main body 140C. A pulley 38 having two pulley grooves 38M, 38S is mounted on an end portion of the shaft 37 opposite to the cam chain case 5. An injector 33, having the same arrangement as that described earlier, is also mounted on an upper portion of the fourth throttle body main body 140C. The injector 33 is inserted and secured slantwise toward the intake valve 10.

A mounting seat 39 is formed in an extended manner on a lower portion of the fourth throttle body main body 140C. A sensor shaft 40 of a throttle opening sensor 22 is mounted to this mounting seat 39. The sensor shaft 40 is inserted by way of a bearing 30 and secured in position with screws 31 so as to run parallel with the shaft 37. A pulley 41 is mounted on an end portion of the sensor shaft 40 of the throttle opening sensor 22 opposite to the cam chain case 5. That is, the throttle opening sensor 22 is mounted on a side opposite to the injector 33.

The motor 21B is mounted by way of a bracket, not shown on a front side of the throttle opening sensor 22 and on an opposite side of the injector 33. The motor 21B is mounted so that a driving shaft 35 thereof runs parallel with the shaft 37. A pulley 42 is mounted on an end portion of the driving shaft 35 of the motor 21B opposite to the cam chain case 5. That means that the motor 21B is mounted on a side opposite to the injector 33. The pulley groove 38M in the pulley 38 of the shaft 37 and a pulley groove in the pulley 42 of the motor 21B are connected by way of an endless wire 43. The pulley groove 38S in the pulley 38 of the shaft 37 and a pulley groove in the pulley 41 of the throttle opening sensor 22 are connected by way of an endless wire 44.

Figure 5:
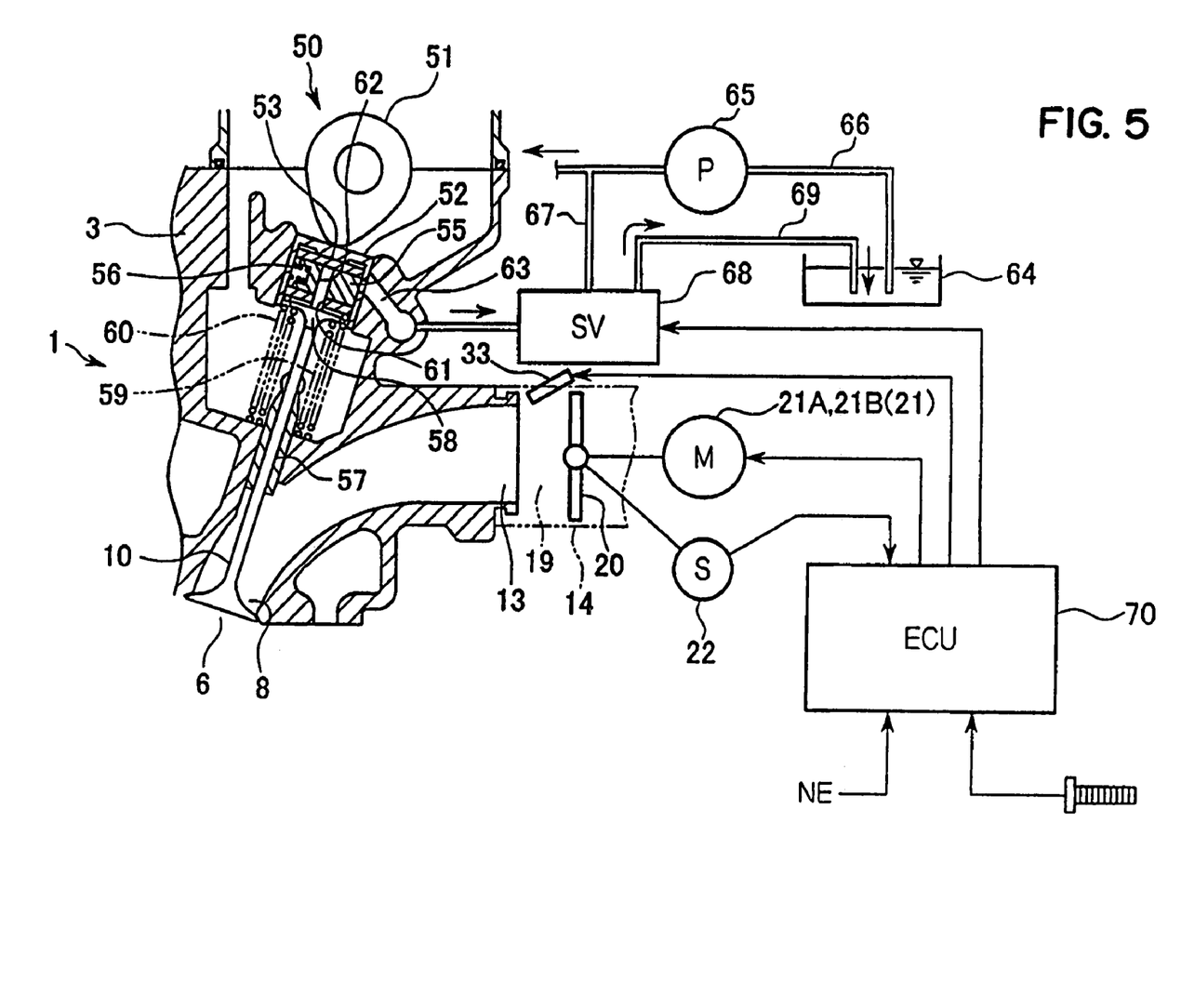
FIG. 5 is a system view showing an embodiment of a valve pause state.
Figure 6:
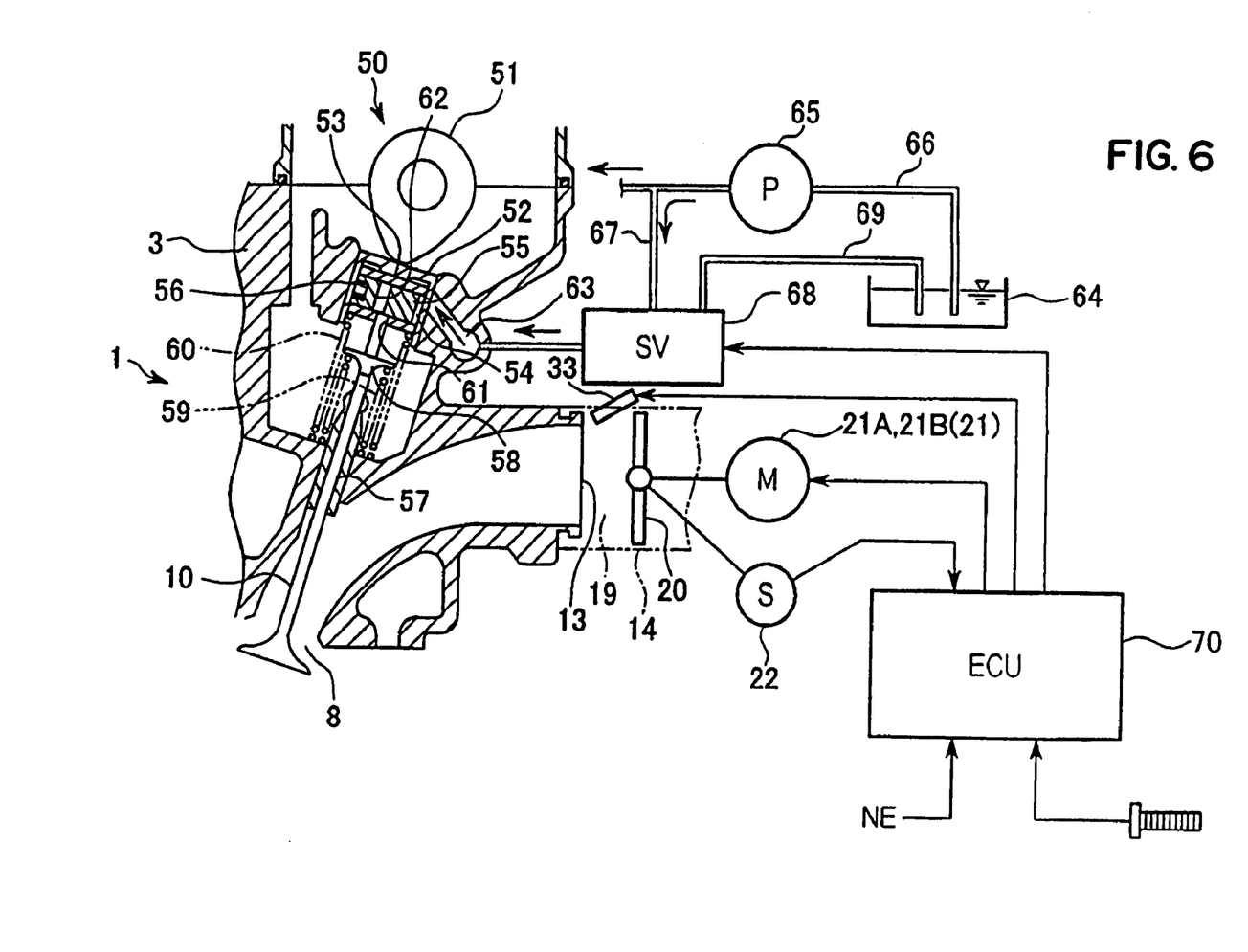
FIG. 6 is a system view showing an embodiment of a valve actuation state.

As shown in FIGS. 5 and 6, a valve pause mechanism is provided for the intake valve 10 and the exhaust valve 11 in each cylinder of the engine 1.

In each of FIGS. 5 and 6, only one intake valve 10 of two intake valves 10 is shown. The other intake valve 10 and the two exhaust valves 11 are omitted in the drawings for clarity purposes.

The valve pause mechanism 50 includes the following components: a valve lifter 52 of a cap shape vertically slideably fitted by insertion into the cylinder head 3 and slidingly contacting a valve moving cam 51; a pin holder 53 vertically slideably fitted into the valve lifter 52; a slide pin 55 slideably fitted in the pin holder 53 to form a hydraulic chamber 54 (shown only in FIG. 6) with an inner peripheral surface of the valve lifter 52; and a return spring 56 provided in a space between the slide pin 55 and the pin holder 53 and exhibiting a spring force urging the slide pin 55 in a direction of reducing a volume of the hydraulic chamber 54.

A hydraulic supply passageway 63 for supplying the hydraulic chamber 54 with hydraulic oil is provided in the cylinder head 3.

A retainer 58 is provided for a valve stem 57 of the intake valve 10. A coil spring 59 provided between the retainer 58 and the cylinder head 3 biases the intake valve 10 in a direction of closing the intake valve opening 8. A coil spring 60 disposed on an outside of the coil spring 59 biases the pin holder 53 upward.

A hole 61 passing through an end portion of the valve stem 57 of the intake valve 10 is formed in a bottom wall of the pin holder 53. A receiving hole 62 receiving the end portion of the valve stem 57 is formed in the slide pin 55.

Referring to FIG. 5, when hydraulic oil is not being supplied through the hydraulic supply passageway 63 to the hydraulic chamber 54, the force of the return spring 56 moves the slide pin 55 to the right in FIG. 5. This brings the receiving hole 62 into alignment with the hole 61 in the pin holder 53. As a result, the end portion of the valve stem 57 of the intake valve 10 is inserted through the receiving hole 62. In this configuration, the motion of the valve moving cam 51 is not transmitted to the intake valve 10, allowing the intake valve 10 to pause.

Referring, on the other hand, to FIG. 6, when the hydraulic oil is supplied through the hydraulic supply passageway 63 to the hydraulic chamber 54, the return spring 56 contracts, causing the slide pin 55 to move to the left in FIG. 6. The end portion of the valve stem 57 is not therefore inserted into the receiving hole 62. A bottom surface of the slide pin 55 then abuts on a leading end of the valve stem 57. The motion of the valve moving cam 51 is then transmitted to the intake valve 10. The intake valve 10 therefore operates.

The hydraulic oil, in an oil pan 64, is supplied to a main hydraulic passageway 66 by a pump 65. A branch passageway 67 from the main hydraulic passageway 66 is connected to the hydraulic supply passageway 63. A spool valve 68 is provided for the branch passageway 67. The spool valve 68 functions as follows. When the spool valve 68 is operated to a position in which the hydraulic oil is supplied through the branch passageway 67 to the hydraulic supply passageway 63 (FIG. 6), the intake valve 10 is placed in an active state. When the spool valve 68 is operated to a position in which the hydraulic oil is supplied through the branch passageway 67 by way of a drain passageway 69 back to the oil pan 64 (FIG. 5), the intake valve 10 is placed in a pause state.

The spool valve 68 is operated based on an input signal to an ECU 70, such as a signal indicating a grip opening, an engine speed NE, or the like. The ECU 70 produces an output of a rotation command signal to each of the motors 21A, 21B, driving the throttle valve 20 based on an opening signal provided by the throttle opening sensor 22. A fuel injection amount at the injector 33 is adjusted based on a control signal from the ECU 70.

When the throttle valve 20 is rotated by each of the motors 21A, 21B through detection of the grip opening, a predetermined amount of fuel in accordance with the detected grip opening is injected from the injector 33. If, at this time, predetermined conditions are met to let the intake valve 10 pause, supply of fuel from the injector 33 can be stopped by the ECU 70 and the throttle valve 20 can be closed by driving the motors 21A, 21B. When the valve pause is canceled and the intake valve 10 is operated again, therefore, the throttle valve in the closed position can be operated to gradually open using the motors 21A, 21B.

Figure 7:
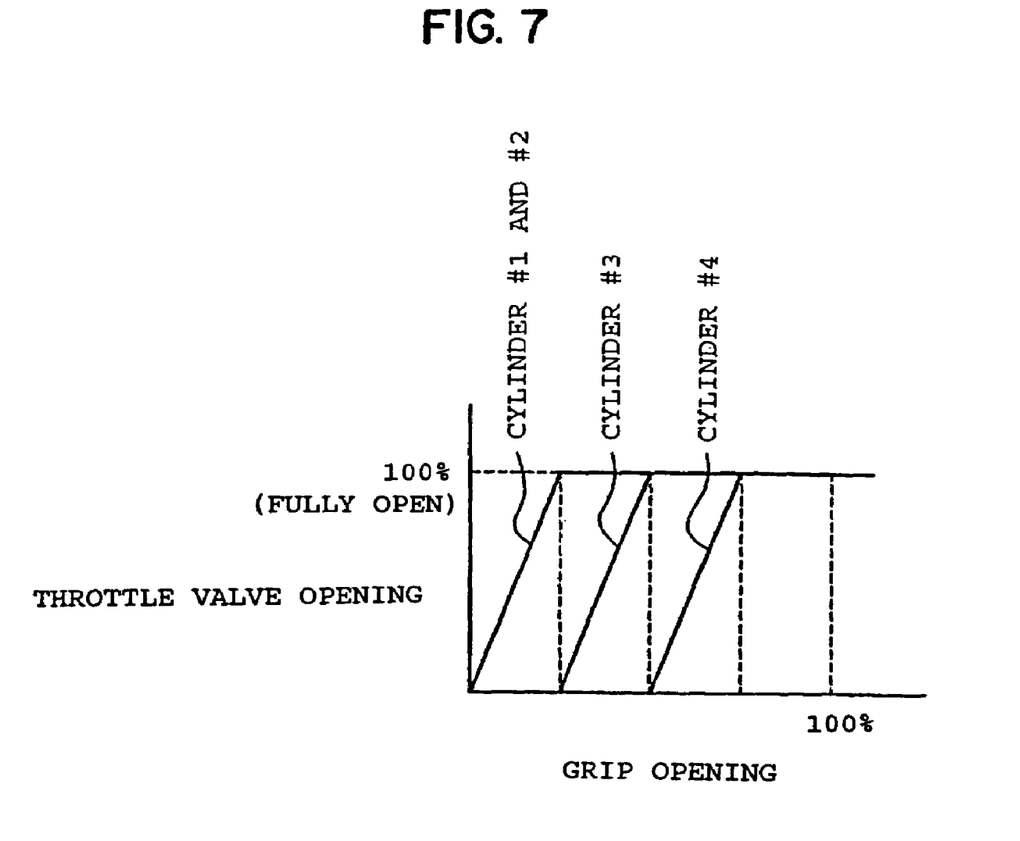
FIG. 7 is an example graph showing a relationship between a grip opening and a throttle opening.

FIG. 7, on which the abscissa represents the grip opening and the ordinate represents the throttle valve opening, illustrates the following. Specifically, when the grip starts opening, the opening of the throttle valves 20 in cylinder #1 and cylinder #2 increases. When the throttle valves 20 in cylinder #1 and cylinder #2 are fully open, the throttle valve 20 in cylinder #3 opens according to the grip opening. When throttle valve 20 in cylinder #3 fully opens, then the throttle valve 20 in cylinder #4 opens according to the grip opening.

In a range having a small grip opening, therefore, the throttle valves 20 are integrated together in the two cylinders of cylinder #1 and cylinder #2, thus allowing throttle control to be performed even more precisely.

In accordance with the embodiment of the present invention described in the foregoing, the throttle valves 20, 20 corresponding to cylinder #1 and cylinder #2 are structurally connected together by means of the common first-second shaft 29. This allows the connected throttle valves 20, 20 to be disposed in close proximity to each other. This arrangement helps shorten the length of the engine 1 in the direction of cylinder layout. The arrangement also allows the connected throttle valves 20, 20 to be integrally driven.

A lightweight engine 1 can therefore be made. Reliability in the electronic throttle control device can also be even further enhanced, since the connected throttle valves 20, 20 can be controlled to open or close simultaneously according to the intention of the rider to accelerate or the like. As touched upon earlier, the throttle opening sensor 22 is mounted on the end portion of the first-second shaft 29 for the first-second throttle body main body 140A. The throttle valves 20, 20 are structurally connected together using the first-second shaft 29, which results in the length in the vehicle width direction being shorter by the amount corresponding to the structural connection. This provides for extra allowance for the length. The throttle opening sensor 22 does not, therefore, contribute to an increased dimension in the width of the engine 1.

The throttle opening sensor 22 and the injector 33 are disposed oppositely on either side of the third or fourth throttle body main body 140B, 140C. This allows the throttle opening sensor 22 and the injector 33 to be disposed separately over the third or fourth throttle body main body 140B, 140C located therebetween. The arrangement thus allows a space around the third and the fourth throttle body main body 140B, 140C to be compactly arranged, enabling an effective use of the surrounding space.

As a result, even when the embodiment of the present invention is applied to a multi-cylinder engine including the four-cylinder engine as embodied in the present invention, there is no need of expanding the gap between cylinders. Thus, downsizing of the engine 1 is achieved.

The first-second motor 21A and the injector 33 are disposed oppositely on either side of the first-second throttle body main body 140A. This allows the first-second motor 21A and the injector 33 to be disposed separately over the first-second throttle body main body 140A located therebetween. The arrangement thus allows a space around the first-second throttle body main body 140A to be compactly arranged, enabling an effective use of the surrounding space.

As a result, even when the embodiment of the present invention is applied to a multi-cylinder engine including the four-cylinder engine as embodied in the present invention, there is no need of expanding the gap between cylinders. Thus, downsizing of the engine 1 is achieved.

The engine is therefore preferably constructed so that the intake valve 10 and the exhaust valve 11 can be brought into a pause state in part of the cylinders of the engine 1, or all of the four cylinders according to the embodiment of the present invention. When the intake valve 10 and the exhaust valve 11 are in the pause state, therefore, the throttle valve 22 can be operated to close using the motor 21. This preferably prevents a valve actuation operation from being resumed from the valve pause state with the throttle valve 22 left open. This allows the valve pause state to smoothly shift to the valve actuation state. That is, the electronic throttle control device, using the motor 21 to open or close the throttle valve 20, is combined with the valve pause mechanism 50. This combination allows the throttle valve 20 to be closed during the valve pause state. A closed throttle valve 20 can therefore be gradually opened during transition to the valve actuation state. As a result, a shift from the valve pause operation to the valve actuation operation can be smoothly made.

The present invention has been described with reference to a specific exemplary embodiment thereof as applied to a motorcycle. It will be understood that the invention is not limited thereto and can also be applied to a four-wheel vehicle. In an application to a four-wheel vehicle, the accelerator pedal opening can be used instead of the grip opening. The present invention has also been described with reference to a specific exemplary embodiment thereof, wherein each of the four cylinders is provided with four valves. The invention nonetheless can be applied to an engine having two valves in each cylinder. The valve pause mechanism is only an example. A valve pause mechanism using a rocker arm to let the valve pause can still be used. Various forms of other embodiments are possible, including one embodiment in which one pair of the intake valve and the exhaust valve of a cylinder is caused to pause, with the other intake and exhaust valves being operated normally.

What is claimed is:

1. A throttle body for controlling a throttle valve in an internal combustion engine, wherein a throttle opening sensor that detects opening of said throttle valve and an injector are disposed on opposite sides of a main body of the throttle body, and further comprising a plurality of throttle valves, wherein only two of the plurality of throttle valves are connected by a shaft.

2. The throttle body of claim 1, wherein each end of the shaft is rotatably supported through a bearing.

3. A throttle body for controlling a throttle valve in an internal combustion engine, wherein a throttle opening sensor that detects opening of said throttle valve and an injector are disposed on opposite sides of a main body of the throttle body, and wherein a motor and an injector are disposed on opposite sides of the main body of the throttle body.

4. A throttle body for controlling a plurality of throttle valves in an internal combustion engine, wherein a motor and an injector are disposed on opposite sides of a main body of the throttle body, at least two of the plurality of throttle valves are connected by a shaft, and each end of the shaft is rotatably supported through a bearing, and a throttle opening sensor that detects opening of at least one of the plurality of throttle valves and an injector are disposed on opposite sides of the main body of the throttle body.

5. A throttle body for controlling a plurality of throttle valves in a multi-cylinder internal combustion engine, wherein each throttle valve is associated with a receptive engine cylinder, and wherein at least two of the plurality of throttle valves are connected, thereby allowing engine valves in at least some of the cylinders in said multi-cylinder internal combustion engine to pause, and a throttle opening sensor that detects opening of at least one of the plurality of throttle valves and an injector are disposed on opposite sides of a main body of the throttle body.

6. The throttle body of claim 5, wherein the two throttle valves are connected by a shaft.

7. The throttle body of claim 6, wherein each end of the shaft is rotatably supported through a bearing.

8. The throttle body of claim 5, wherein a motor and an injector are disposed on opposite sides of a main body of the throttle body.

9. An internal combustion engine, comprising:
   four engine cylinders;
   four throttle valves, each said throttle valve associated with a respective said engine cylinder; and
   three motors for controlling the throttle valves, wherein two of the throttle valves are connected to and driven by a single one of the motors and each of the other two throttle valves are individually connected to and driven by a respective one of the other two motors.

10. The internal combustion engine of claim 9, wherein the two throttle valves that are connected to and driven by the single motor are connected by a shaft, and further comprising a throttle opening sensor mounted on an end of the shaft and a throttle driving mechanism mounted on an opposite end of the shaft.

11. The internal combustion engine of claim 10, wherein the single motor, the throttle opening sensor, and an injector are disposed on opposite sides of a main body of the two throttle valves driven by the single motor.

12. The internal combustion engine of claim 9, further comprising engine valves in the engine cylinders associated with the two individually driven throttle valves, and wherein the engine valves can be placed in a pause state.

* * * * *